United States Patent [19]

Murase

[11] Patent Number: 5,321,767
[45] Date of Patent: Jun. 14, 1994

[54] METHOD OF FORMING A MASK IN IMAGE PROCESSING OPERATION

[75] Inventor: Takahiro Murase, Hiratsuka, Japan

[73] Assignee: Kabushiki Kaisha Komatsu Seisakusho, Tokyo, Japan

[21] Appl. No.: 937,241

[22] Filed: Aug. 28, 1992

[51] Int. Cl.$^5$ .............................................. G06K 9/00
[52] U.S. Cl. ......................................... 382/8; 382/51; 348/130
[58] Field of Search ...................... 382/8, 48, 51, 33; 358/101, 106

[56] References Cited

U.S. PATENT DOCUMENTS

| | | | |
|---|---|---|---|
| 4,583,125 | 4/1986 | Yamada | 382/8 |
| 5,034,986 | 7/1991 | Karmann et al. | 382/48 |
| 5,060,280 | 10/1991 | Mita et al. | 382/48 |
| 5,115,475 | 5/1992 | Lebeau | 382/8 |
| 5,140,650 | 8/1992 | Casey et al. | 382/33 |
| 5,218,645 | 6/1993 | Bacus | 382/48 |

FOREIGN PATENT DOCUMENTS 4-165577  6/1992  Japan .

*Primary Examiner*—David K. Moore
*Assistant Examiner*—D. R. Anderson
*Attorney, Agent, or Firm*—Richards, Medlock & Andrews

[57] ABSTRACT

A process for examining the appearance of an examination object has the steps of taking an image of the object to obtain image data and processing the image data by an image processing apparatus. A mask is formed to determine, in the image data to be processed, a non-examination region of various configurations and, when the position of the examination object is deviated from the correct position, the position of the mask also is shifted correspondingly to enable appearance examination in varying conditions. To this end, a brightness threshold value is set in the input multi-value image data so as to define the non-examination region to be excluded from said examination region, thereby forming said mask, and the pixels having gradation levels not higher or lower than the threshold value are excluded from the examination region.

11 Claims, 4 Drawing Sheets

METHOD OF FORMING A MASK IN IMAGE PROCESSING OPERATION

BACKGROUND OF THE INVENTION

1. Field of the Invention

The present invention relates to a method of forming a mask in an image processing operation and, more particularly, to a method of forming a mask in an image processing operation conducted for the purpose of examining the appearances of articles.

2. Description of the Related Arts

The present invention relates to a method of forming a mask in image processing. In general, a method for checking the appearances of articles for any defect by an image processing technique employs a comparison between image data of a region determined in accordance with the configuration of the article as the examination object and the image data actually obtained from the article, so that any defect can be detected on the basis of the difference between these two kinds of image data. In the case where a multiplicity of articles are examined, as in the case of a production line, it is often experienced that the configurations of the article delicately differ from one another. It has been therefore attempted to approximate, with a known function, the contour of the examination object of the input image data, for each type of article, and a predetermined region is extracted from the approximating function so as to be used as the region conforming with the configuration of the examination object. The known function approximating the configuration of the examination object may be linear lines which are determined by the least square method on the basis of the points of the configuration, or a pattern determined by such linear lines. The function also may be a circle or a quadratic function.

The present applicant has filed an application for a patent, as Japanese Patent Application No. 2-293349, on an improvement in an image processing apparatus which is shown in FIG. 8 attached hereto. Referring to FIG. 8, the image processing apparatus 50 has an image LSI control device 51, the input end of which is connected to a switching control device 52 which is composed of a mode change-over circuit 54 and a synchronizing device 55. The mode switching circuit 54 is adapted to be changed-over by the MPU (main processing unit) 53. More specifically, the mode switching circuit 54 operates in response to a control signal from the MPU 53 so as to connect the latter selectively either to the synchronizing device 55 or the image LSI (large scale integrated circuit) control device 51. Consequently, the LSI control device 51 receives, either from the MPU 53 or the synchronizing device 55, a trigger signal $S_T$ for controlling an image processing LSI 56 which is a module exclusively for image processing. The synchronizing device 55 also receives a synchronizing signal which is supplied from a synchronizing signal generating circuit 57 adapted for generating the synchronizing signal of TV (television) rate. The synchronizing device 55 synchronizes the output of the MPU 53 with the synchronizing signal from the synchronizing signal generating circuit 57 and delivers the same to the image LSI control device 51 as the trigger signal $S_T$ for triggering the operation of the image processing LSI 56. The MPU 53 controls all the devices in the apparatus 50, including an input selection circuit 58 and an output selection circuit 59.

A buffer device 61 is provided between the input selection circuit 58 and an analog-to-digital (A/D) converter 60. The input buffer device 61 includes a pair of image input memories 62a, 62b and a memory change-over portion 63 for selectively connecting one of the image input memories 62a, 62b to the A/D converter 60. The trigger signal $S_T$ from the switching control device 52 is supplied to the input buffer device 61 as the switching timing signal for the switching between the image input memories 62a and 62b.

The image processing LSI 56 has three pins (input 1, input 2, input 3) which are not shown, so that it can simultaneously read the image data stored in any three memories selected by the input selection circuit 58 out of the image memories 64a, 64b, 64c, ..., 64n and the image input memory 62a, 62b. The memory switching portion 63, however, is so constructed as not to allow the image input memories 62a, 62b to be selected simultaneously.

An image output memory 65, connected to the output selection circuit 59, temporarily holds the data output from the image processing LSI 56 and delivers the same to a display 67 via a digital-to-analog converter (D/A) 66.

According to this arrangement, the switching control device 52 performs, at a predetermined period or at an arbitrarily timing, the switching between a plurality of image input memories 62a, 62b, and the data from the selected image input memory is read, in synchronization with the switching, by the image processing LSI 56 which is a module used exclusively for the image processing. For instance, when it is necessary to process an image determined by image data picked up by a TV camera 68, it is possible to operate the image processing LSI 56 in synchronization with the TV rate. Therefore, when processing image data from an image input device which does not require a synchronizing signal, as is the case of processing of image data from the image memories 64a, 64b, 64c, ..., 64n, it is possible to execute the processing by the image processing LSI 56 in such a manner as to cope with variation in the processing time, thus attaining a remarkable improvement in the image data processing efficiency.

When the image processing LSI 56 is connected to readable image memories 64a, 64b, 64c, ..., 64n for processing data in such memories, the switching control device 52 delivers a processing start trigger signal $S_T$ to the image processing LSI 56 at a timing corresponding to the length of the processing time, so that the image processing LSI 56 is controlled in accordance with the length of the processing time. For instance, when the image processing performed by the image processing LSI 56 and the processing performed by the MPU 53 which controls the whole apparatus 50 are to be executed consecutively, the image processing LSI 56 can be controlled in accordance with the length of the processing time, so that the data processing efficiency is improved.

This improved apparatus, however, is still unsatisfactory in that it suffers from the following problem which is encountered when the articles to be examined have prints of letters or symbols as in the cases of electronic parts or when the articles are plastic parts having complicated configurations such as gears. More specifically, the examination of the surface state or configuration of an article with letters or symbols printed thereon is conducted by inputting multi-value image data showing the surface state or configuration of the article and finding any difference in the gradation values of pixels corresponding to the non-defective portion and the gradation values of pixels corresponding to the defective portion. In some cases, however, there is only a slight difference in the gradation value between any defective part and the printed letters or symbols, making it difficult to decisively discriminate between such defective part and the printed letters or symbols. Such a problem would be overcome by forming a masking region which would conceal the printed letters or symbols so as to neglect the data carried by the pixel inside such a mask. It is, however, extremely difficult to approximate contours of characters such as Japanese hiragana and kanjis with linear lines, circle or quadratic function through the least square method.

Examination of surface state or contour of a plastic article having a complicated configuration such as a gear also is conducted by inputting multi-value image data showing the surface state or configuration of the article and finding any difference in the gradation values of pixels corresponding to the non-defective portion and the gradation values of pixels corresponding to the defective portion. In this case, difficulty is encountered in the discrimination between defective and non-defective portions, particularly when only a small difference is presented in the gradation value between the pixels corresponding to the defective portion and pixels corresponding to background or letter portion.

As will be understood from the foregoing description, the aforementioned method relying upon formation of a region on the image data by approximating the configuration of the examination object through approximation by a function cannot satisfactorily be used in the examination of appearances of articles which are complicated in configurations or which have letters or symbols printed thereon.

SUMMARY OF THE INVENTION

An object of the present invention is to provide, in a process for examining the appearance of an examination object by taking an image of the object by image take-up means and processing the image data by an image processing apparatus, a method of forming a mask for setting, within the image data, a non-examination region of various configurations and in which, when the position of the examination object has been displaced from a predetermined position, the nonexamination region is moved in accordance with the deviation, thus enabling the appearance examination under varying conditions.

To this end, according to one aspect of the present invention, there is provided, in a process for examining the appearance of an examination object by taking an the image of the object to obtain image data and processing said image data by an image processing apparatus, a method of forming, in an examination region which is determined by a known function, a mask indicating a non-examination region which is to be excluded from the processing of the image data, comprising: setting a brightness threshold value in the input multi-value image data so as to define the non-examination region to be excluded from said examination region, thereby forming said mask.

The above and other objects, features and advantages of the present invention will become clear from the following description when the same is read in conjunction with the accompanying drawings.

DESCRIPTION OF THE PREFERRED EMBODIMENT

Figure 1:
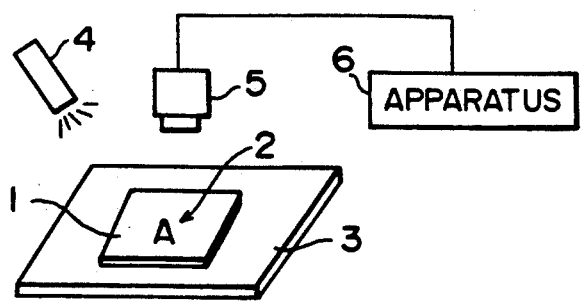
FIG. 1 is a schematic illustration of the whole construction of an appearance examination apparatus.

Referring to FIG. 1 which is a schematic illustration of the whole construction of an appearance examination apparatus, numeral 1 denotes an article as an examination object, 2 denotes a letter printed on the article 1, 3 denotes a stage or platform on which the examination object 1 is placed for examination and 4 denotes an illuminating light source which applies light from the upper side. Numeral 5 designates a television camera which takes an image of the article 1 from the upper side of the latter, and 6 denotes an image processing apparatus which processes the image data supplied from the television camera 5.

Figure 2:
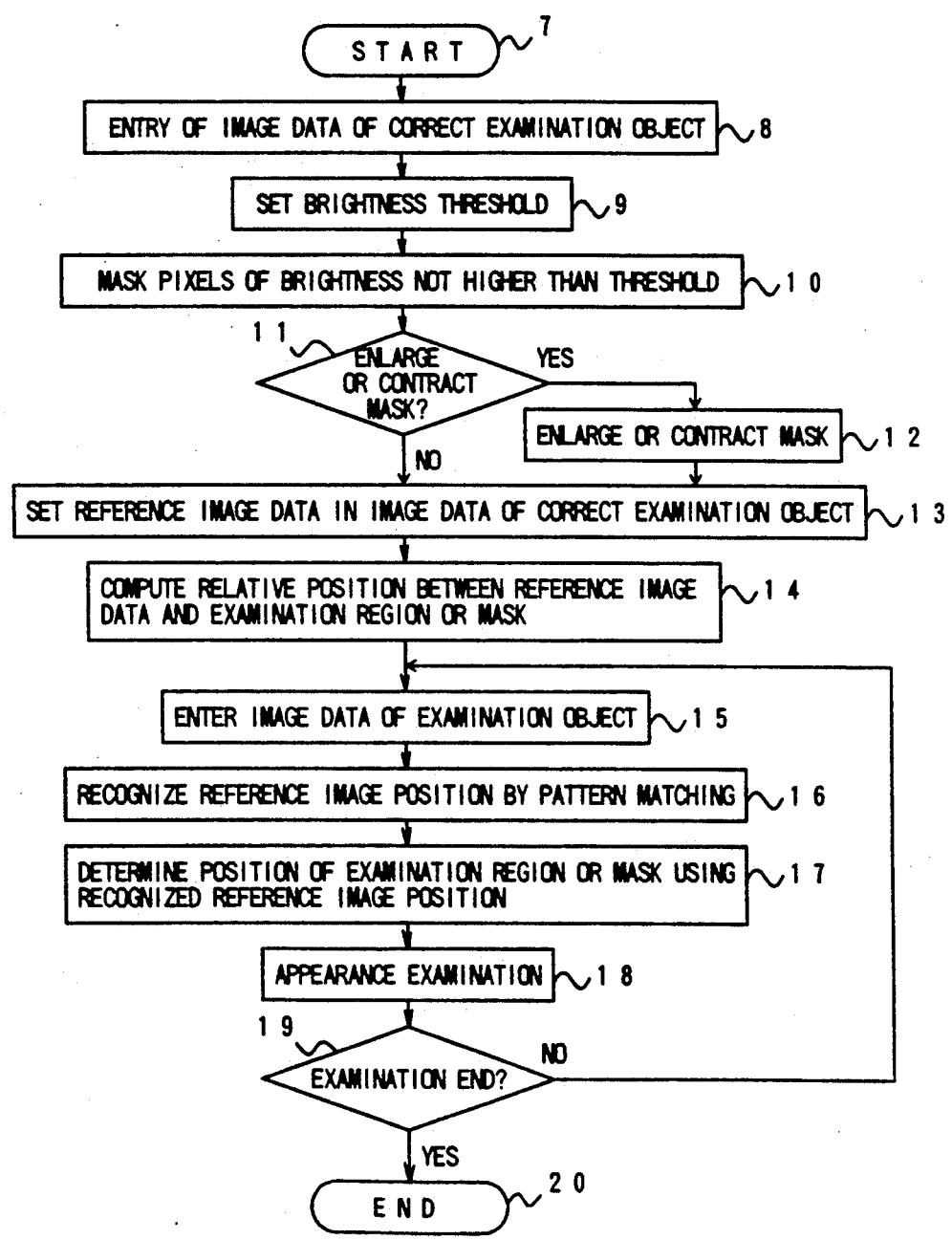
FIG. 2 is a flow chart showing the process of the invention for forming a mask.
Figure 3:
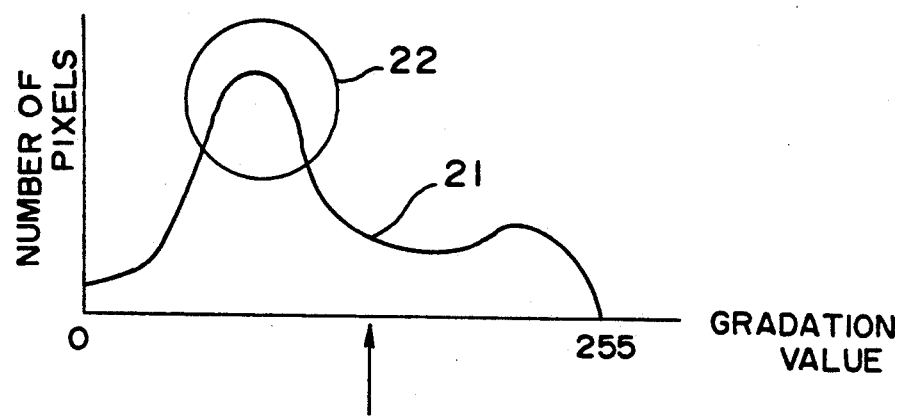
FIG. 3 is an illustration of gradation value distribution of pixels which are within an examination region.

FIG. 2 is a flow chart showing the process of the invention for forming a mask. The mask forming process is executed on the image data of the examination object 1 shown in FIG. 1, such data being entered in Step 8 "entry of image data of correct examination object" in the flow chart shown in FIG. 2. FIG. 3 is an illustration of gradation value distribution of pixels which are within an examination region. In the illustrated embodiment, there are 256 gradation levels or values. The term "examination region" is used in this specification to mean a region which is used for selecting, from among the picked-up image data of the examination object, data to be employed in the image processing and which is set by a known function, for example, a rectangle or a circle. In FIG. 3, a curve 21 exemplarily shows the distribution of gradation values. A peak in the portion encircled by a circle 22 corresponds to the letter 2 printed in the examination object 1 shown in FIG. 1. In such a case, a threshold level is set to a point shown by an arrow in FIG. 3 (Step 9 in the flow chart of FIG. 2), so that the appearance of the portions other than the letter 2 can be examined because the pixels corresponding to the letter 2 are excluded from the image data to be processed (Step 10), so that the examination can be executed without being executed by the letter 2 regardless of how the letter 2 may be complicated in configuration. The above-described operation is enough to enable examination provided that there is no variation in the brightness of the image at the edge of the formed mask due to illuminating condition and that there is no deviation of the position of the examination object.

Figure 4:
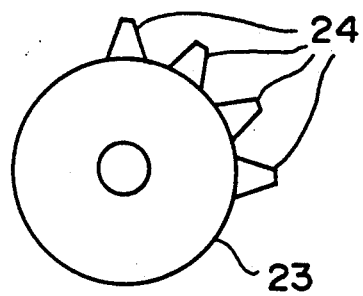
FIG. 4 is an illustration of a gear as an example of the examination object.
Figure 5:
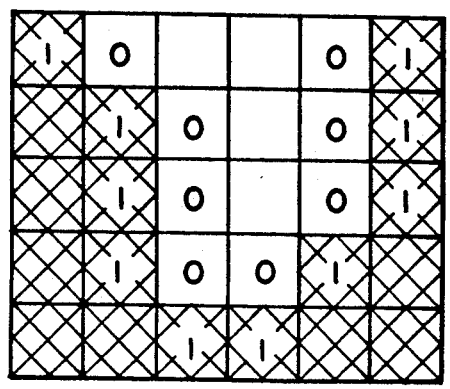
FIG. 5 is an illustration of image data obtained by taking an image of the gear.

In some cases, however, a variation in the image brightness may occur on the edge of the formed mask, due to presence of convexities and concavities or a printed letter 2 on the surface of the article 1 to be examined. A description will now be given of the mask forming method which is employed when there is such a variation in the image brightness. FIG. 4 shows a gear 23 having teeth 24, four of which are shown. FIG. 5 shows a part of the image data obtained by taking an image of the gear 23 in Step 8 of the flow chart of FIG. 2 for the entry of the correct gear to be examined. In FIG. 5, each elementary square shows a pixel. Thickened (hatched) pixels having low gradation values are pixels which form the image of the gear, whereas thin-color (white) pixels having high gradation values are those showing the background of the gear 23. Since the gear 23 is a three-dimensional object, a variation of brightness tends to occur on the pixels which are on the edge of the gear image, depending on the illuminating conditions. When the gear 23 is a plastic article formed by injection molding, for example, it is necessary to examine the surface state and the configuration of the gear 23. For the reasons stated above, the examination requires removal or elimination of the influence of the image brightness variation which may occur in the edge portion of the image. This case corresponds to an answer YES given to a question posed in Step 11 of the flow chart shown in FIG. 2. In such a case, the initially set mask is expanded by adding a predetermined number of pixels in each direction from the edge of the initially set mask so as to mask the portions where the change in the brightness tends to occur (Step 12 in the flow chart shown in FIG. 2). For instance, in FIG. 5, pixels containing the character "1" are the pixels which determine the edge of the initially set mask, while pixels containing the character "0" are the pixels which are newly added to expand the mask so as to cover the edge portions where the brightness variation tends to occur.

Figure 6:
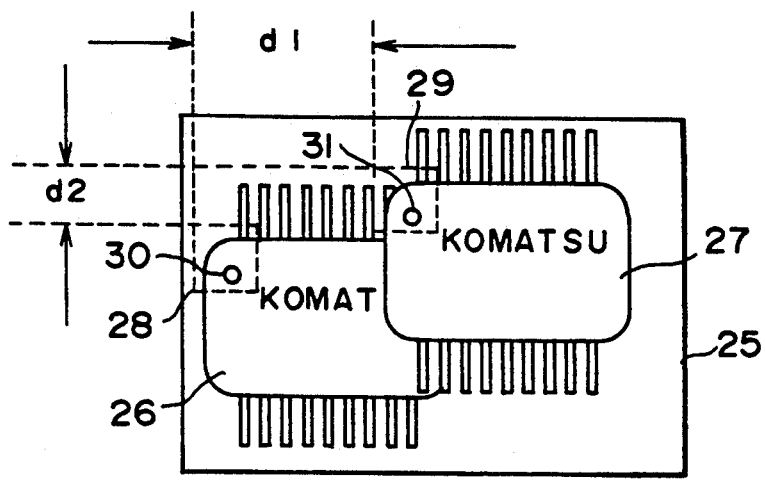
FIG. 6 is an illustration of position deviations of articles to be examined on a production line which mass produces such articles.

A description will now be given of the method for eliminating influence of the deviation of the position of the examination object 1 from the correct position. When a large quantity of articles such as injection molded parts or electronic parts produced by a production line are to be examined consecutively, a difficulty is encountered due to the position of each article which deviates from the expected position, since not all of the articles are positioned correctly at the expected position on the examination stage 3 with respect to the examination apparatus. Referring to FIG. 6, numeral 26 denotes an IC (integrated circuit) product which is positioned correctly at the expected position, while numeral 27 denotes the position of an IC product which is positioned at a deviation from the expected position. Numeral 28 denotes a region defined on a predetermined portion of the IC product 26, while numeral 29 denotes a corresponding region on the IC product 27. Numeral 30 and 31 denote marks which are indicative of the direction of orientation of the respective IC products and which are essentially provided on the IC products of the kind described. Distances d1 and d2 denote the amounts of deviation of the actual position of the IC product 27 in the X and Y directions from the expected position.

A description will now be given of a method for examining the state of the surface of the portions of the IC package other than the letters KOMATSU printed on the IC article of FIG. 6 by way of example. After the entry of the image of the correct IC product (Step 8 in the flow chart of FIG. 2), a mask is formed in accordance with the procedure explained before (Steps down to Step 12 in the flow chart shown in FIG. 2). After forming one of the three types of masks mentioned before, it is possible for the operator to effect editing of the mask, such as addition or deletion of the rectangular or circular mask using a known function or deformation of the mask region on the pixel basis.

Then, the image in the region 28 which is a portion of the correct IC product is used as reference image data (Step 13 in the flow chart shown in FIG. 2) and the positional relationship between the reference image data and the examination region or the formed mask is computed and stored (Step 14 in the flow chart shown in FIG. 2). Since there is a fixed relation between the reference image data and the examination region or the formed mask, it is possible to correctly locate the examination region and the formed mask with respect to the deviated IC product, provided that the above-mentioned positional relationship is stored.

Figure 7:
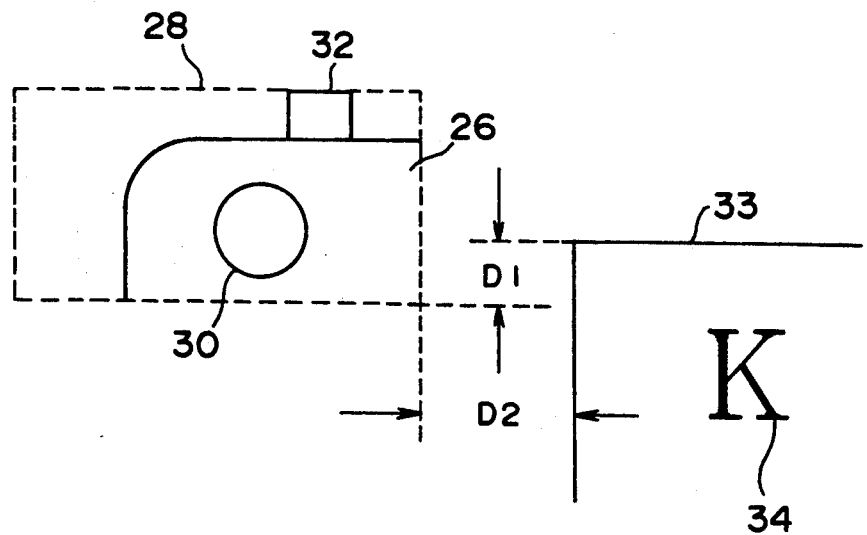
FIG. 7 is an illustration of an example of the positional relationship between reference data and an examination region or a mask which has been formed.
Figure 8:
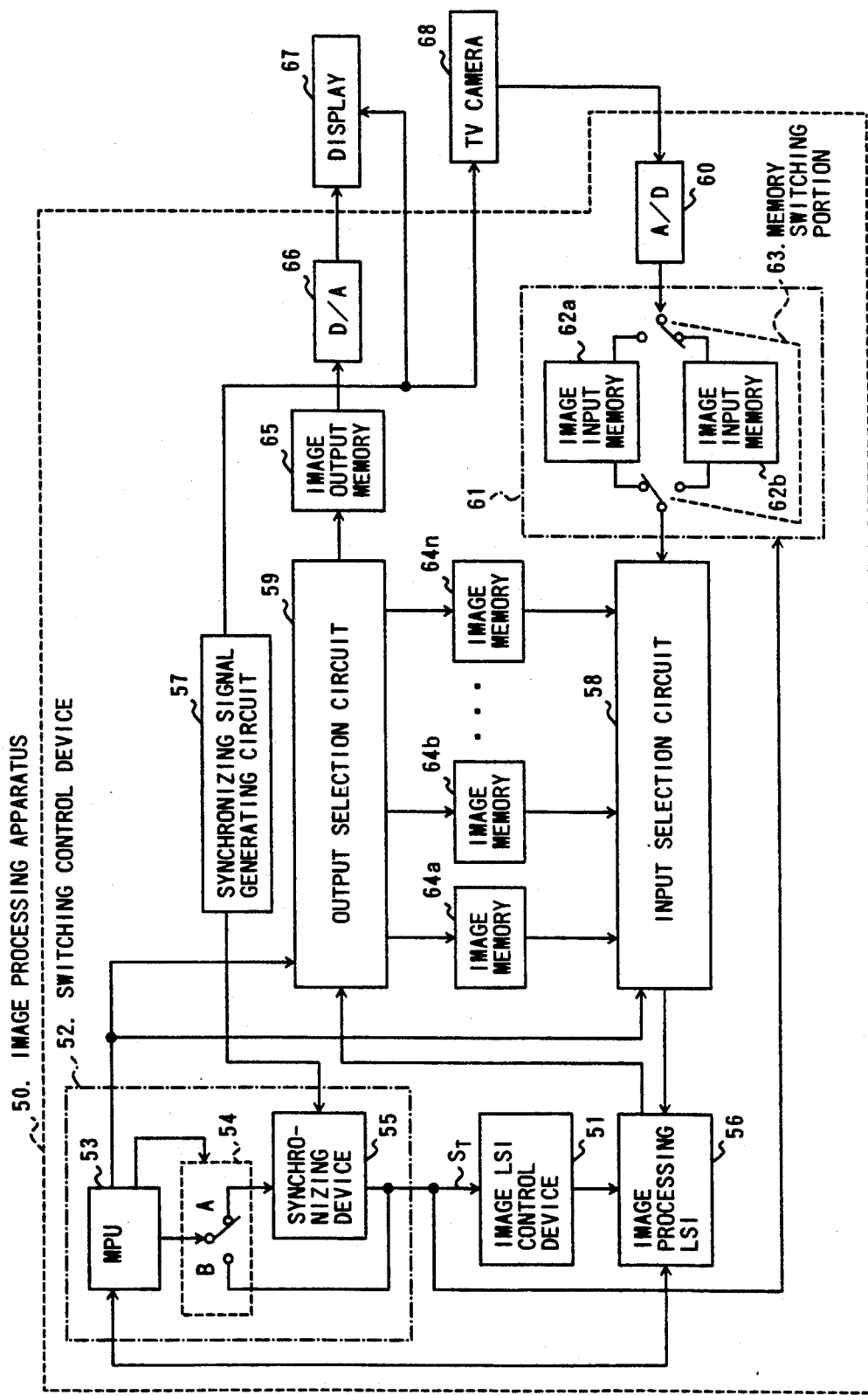
FIG. 8 is an illustration showing the whole construction of my prior appearance examination apparatus.

FIG. 7 illustrates an example of such operation for correctly locating the mask with respect to the examination object. The positional relationship between the reference image data 28 and the examination region 33 is expressed in terms of distances D1 and D2 between two points. In this case, only the relative positional relationship concerning the examination region 33 is stored, since there is a fixed positional relationship between the examination region 33 and the formed mask 34. The reference image data is preferably obtained from the portion of the examination object which is peculiar to the object, i.e., a portion which enables discrimination from other types of articles or a portion having a specific contour. In the embodiment shown in FIG. 6, such reference image data is obtained from a corner of the IC package containing the mark 30 indicative of the direction of orientation of the product.

Subsequently, the image data of the current IC package to be examined is inputted (Step 15 of the flow chart shown in FIG. 2). Since the position of the current examination object, i.e., IC 27, has been deviated from the correct position indicated by the IC 26, it is necessary to correspondingly shift the position of the mask which has been formed through Steps 9 to 12 of the flow chart shown in FIG. 2, in conformity with the actual position of the currently examined IC 27. To this end, using the image in the region 28 as the reference image data, a search is conducted to find, within the image data of the currently examined IC 27, a region 29 which exhibits the closest correlation to the reference data, using a pattern matching technique (Step 16 of the flow chart shown in FIG. 2). Since the positional relationship between the reference region 28 and the examination region 33 or the formed mask 34 has been known from the distance data D1 and D2 (Step 14 of the flow chart shown in FIG. 2), it is possible to set the examination region 33 correctly with respect to the actual position of the examination object IC 27, by using the above-mentioned fixed positional relationship, so that the portion to be masked (printed letters) can be masked without fail regardless of the deviation of the position of the current examination object IC 27 from the expected position (Step 17 of the flow chart shown in FIG. 2). Then, the appearance examination is executed in the manner described (Step 18 of FIG. 2) and, after completion of the examination of all the products (answer YES in Step 19 in the flow chart of FIG. 2), the examination process is ceased, whereas, when there still remains products to be examined (answer NO in Step 19 of FIG. 2), the process returns to Step 15 of FIG. 2 thus repeating the examination for the next product to be examined.

Although the invention has been described through its specific form, it is to be understood that the described embodiments are only illustrative and various changes and modifications may be imparted thereto without departing from the scope of the invention which is limited solely by the appended claims.

What is claimed is:

1. A process for examining the appearance of a plurality of examination objects to detect any defect in said examination objects, said process comprising:

taking an image of each said examination object to obtain input multi-value image data showing the appearance of each said examination object, each said image including an examination region which is determined by a known function, forming for each said examination region a mask indicating a nonexamination region which is to be excluded from the processing of said input multi-value image data for a respective examination object, wherein the mask is formed by setting a brightness threshold value in the input multi-value image data so as to define a non-examination region to be excluded from an examination region; and processing the input multi-value image data by an image processing apparatus, wherein the examination position of an examination object at the time of examination can vary from the correct position for examination, said process further comprising the steps of:

storing, as reference image data, the input multi-value image data of a preselected portion of one of said examination objects when located at the correct position;

computing the positional relationship between said reference image data and at least one of an examination region on an examination object and said mask;

inputting the image data of another of said examination objects when located at an examination position;

computing, by a pattern matching technique, the position of the portion of the inputted image data of said another examination object which corresponds to said preselected portion; and positioning said examination region and said mask for said another examination object with respect to said portion of the inputted image data for said another examination object on the basis of said positional relationship; and then processing only the input multi-value image data for the portion of the examination region for said another examination object which excludes the non-examination region, to thereby detect any defects in the appearance of said another examination object.

2. A process for examining the appearance of examination objects to detect any defect in the examination objects, wherein the examination position of an examination object at the time of examination can vary from the correct position for examination, said process comprising the steps of:

storing, as reference image data, the image data of a preselected portion of one of said examination objects when said one of said examination objects is located at the correct position for examination;

computing the positional relationship between said reference image data and at least one of an examination region of an examination object and a mask for masking a portion of said examination region, said examination region being defined by a known factor;

inputting the image data of another of said examination objects when located at its examination position;

computing, by a pattern matching technique, the position of the portion of the inputted image data of said another examination object which corresponds to said preselected portion;

positioning said examination region and said mask with respect to said portion of the inputted image data for said another examination object on the basis of said positional relationship; and then processing only that portion of the inputted image data for said another examination object which corresponds to said examination region excluding the portion thereof masked by said mask, to detect any defects in the appearance of said another examination object.

3. A process according to claim 2, wherein said inputted image data for said another examination object is given in the form of multigradation pixel signals carried by a multiplicity of pixels, and the pixels having brightness not lower than a threshold level are masked by said mask so as to be excluded from the examination region.

4. A process according to claim 3, further comprising contracting said mask by shifting the edge of said mask inwardly of said mask by a predetermined number of pixels.

5. A process according to claim 3, further comprising expanding said mask by shifting the edge of said mask outwardly of said mask by a predetermined number of pixels.

6. A process according to claim 2, wherein said inputted image data for said another examination object is given in the form of multigradation pixel signals carried by a multiplicity of pixels, and the pixels having brightness not higher than a threshold level are masked by said mask so as to be excluded from the examination region.

7. A process according to claim 6, further comprising contracting said mask by shifting the edge of said mask inwardly of said mask by a predetermined number of pixels.

8. A process according to claim 7, further comprising expanding said mask by shifting the edge of said mask outwardly of said mask by a predetermined number of pixels.

9. A process according to claim 2, wherein each examination object comprises an article having at least one printed symbol on a surface thereof, and said mask excludes the inputted image data corresponding to said at least one printed symbol.

10. A process in accordance with claim 2 wherein each examination object comprises an article having a complicated configuration, and said mask excludes the inputted image data corresponding to at least an edge portion of the respective article.

11. In a process for examining the appearance of an examination object to detect any defect in said examination object by taking an image of said examination object to obtain input multi-value image data showing the appearance of said examination object, said image including an examination region which is determined by a known function, and processing said input multi-value image data by an image processing apparatus, the improvement of forming in said examination region a mask indicating a nonexamination region which is to be excluded from the processing of said input multi-value image data, wherein the mask is formed by setting a brightness threshold value in the input multi-value image data so as to define the non-examination region to be excluded from said examination region; and then processing only the input multi-value image data for the portion of said examination region which excludes said non-examination region, to thereby detect any defects in the appearance of said examination object;

wherein said examination object comprises an article having at least one printed symbol on a surface thereof, and said brightness threshold value excludes the input multi-value image data corresponding to said at least one printed symbol, whereby the appearance of a portion of said examination object other than said at least one printed symbol can be examined.

* * * * *